No. 702,407. Patented June 17, 1902.
P. J. COLLINS.
MOTOR GENERATOR.
(Application filed Oct. 11, 1901.)
(No Model.) 3 Sheets—Sheet 1.

Witnesses
Fenton S. Belt,
C. W. Clement.

Inventor
Patrick J. Collins
By
Watson & Watson
Attorneys

No. 702,407.　　　　　　　　　　　　　　　　Patented June 17, 1902.
P. J. COLLINS.
MOTOR GENERATOR.
(Application filed Oct. 11, 1901.)

(No Model.)　　　　　　　　　　　　　　　　3 Sheets—Sheet 2.

No. 702,407. Patented June 17, 1902.
P. J. COLLINS.
MOTOR GENERATOR.
(Application filed Oct. 11, 1901.)
(No Model.) 3 Sheets—Sheet 3.
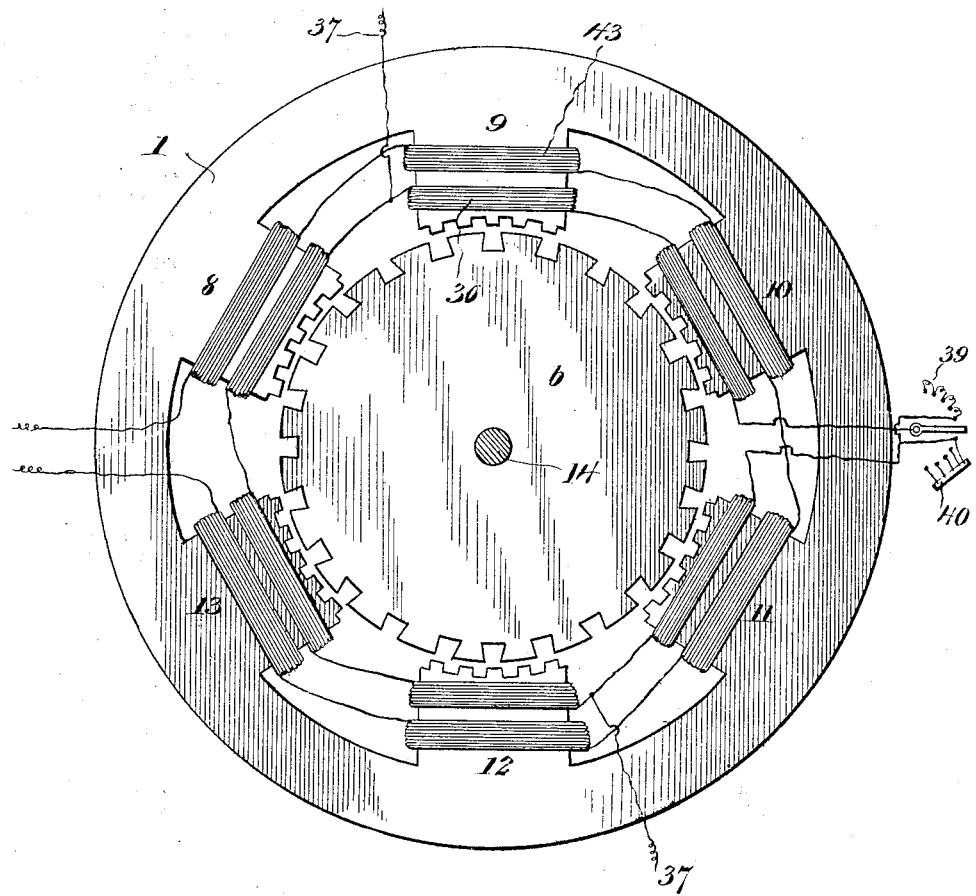

UNITED STATES PATENT OFFICE.

PATRICK JOSEPH COLLINS, OF SCRANTON, PENNSYLVANIA, ASSIGNOR OF ONE-HALF TO CHRISTOPHER G. BOLAND, OF SCRANTON, PENNSYLVANIA.

MOTOR-GENERATOR.

SPECIFICATION forming part of Letters Patent No. 702,407, dated June 17, 1902.

Application filed October 11, 1901. Serial No. 78,372. (No model.)

*To all whom it may concern:*

Be it known that I, PATRICK JOSEPH COLLINS, a citizen of the United States, residing at Scranton, in the county of Lackawanna, State of Pennsylvania, have invented certain new and useful Improvements in Motor-Generators, of which the following is a specification.

This invention relates to improvements in motor-generators whereby several currents differing in character may be derived from the same machine and the electromotive force frequency and volume of current may be readily regulated.

The generator is designed particularly for the use of physicians, and the currents derived from the machine may be employed in various ways in treating patients.

Figure 1:
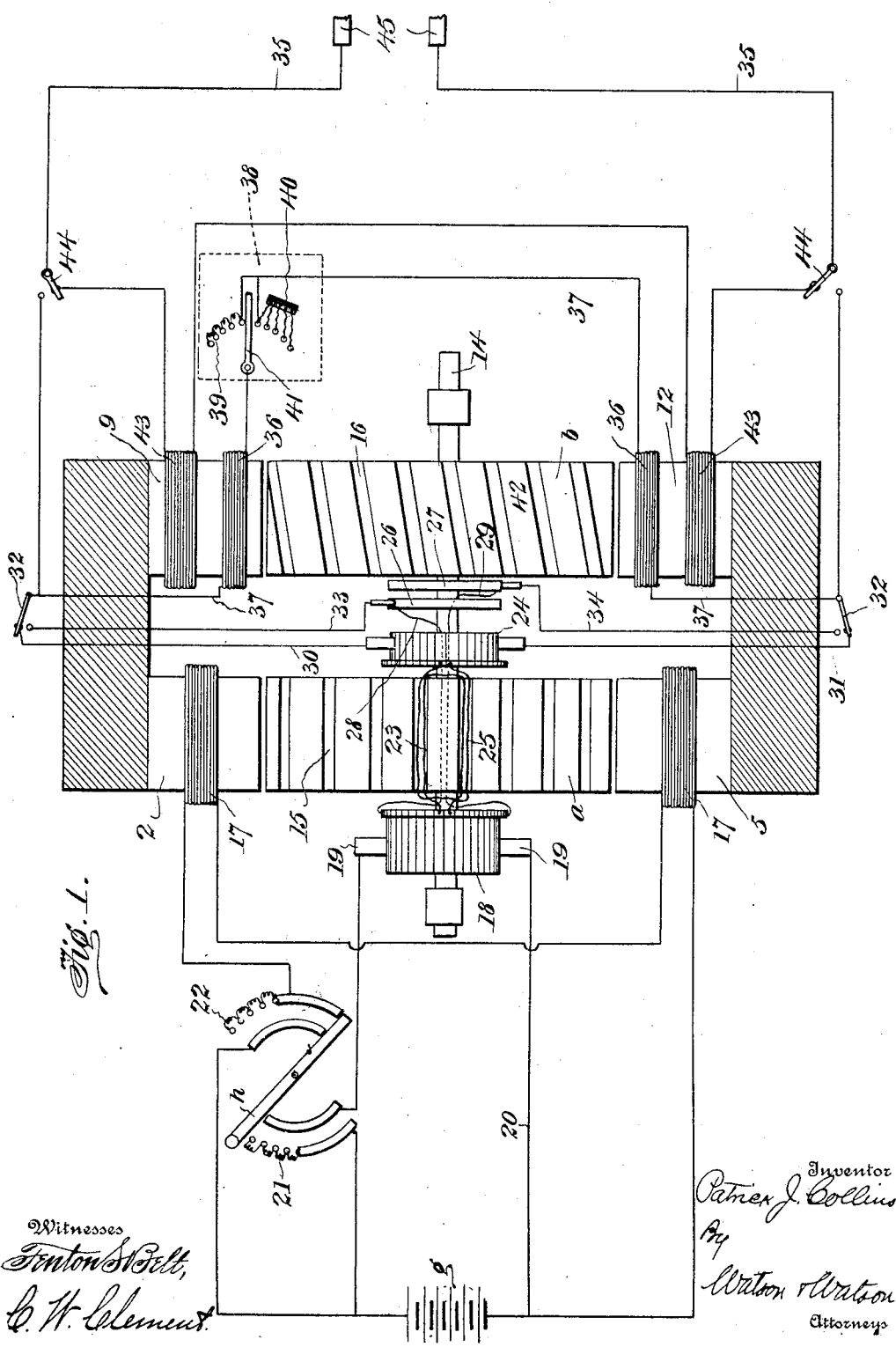
Figure 4:
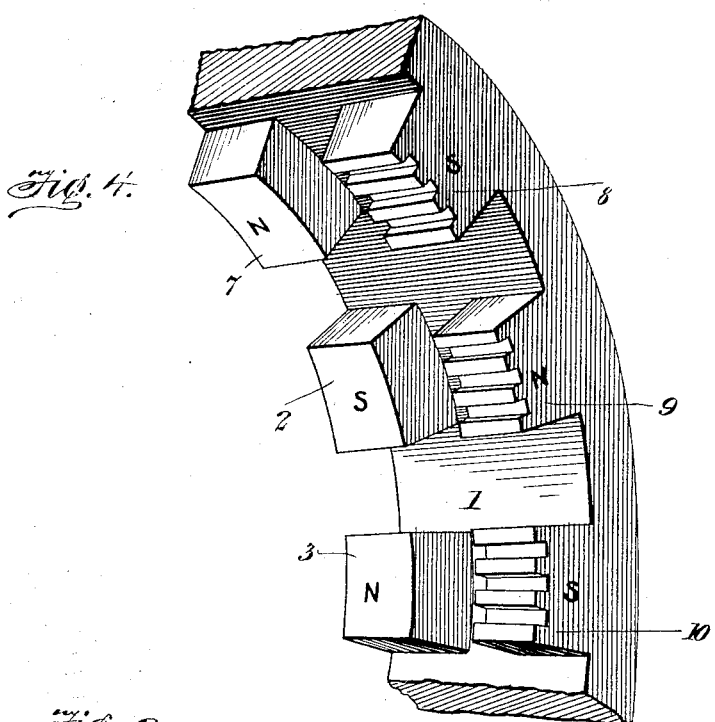
Figure 2:
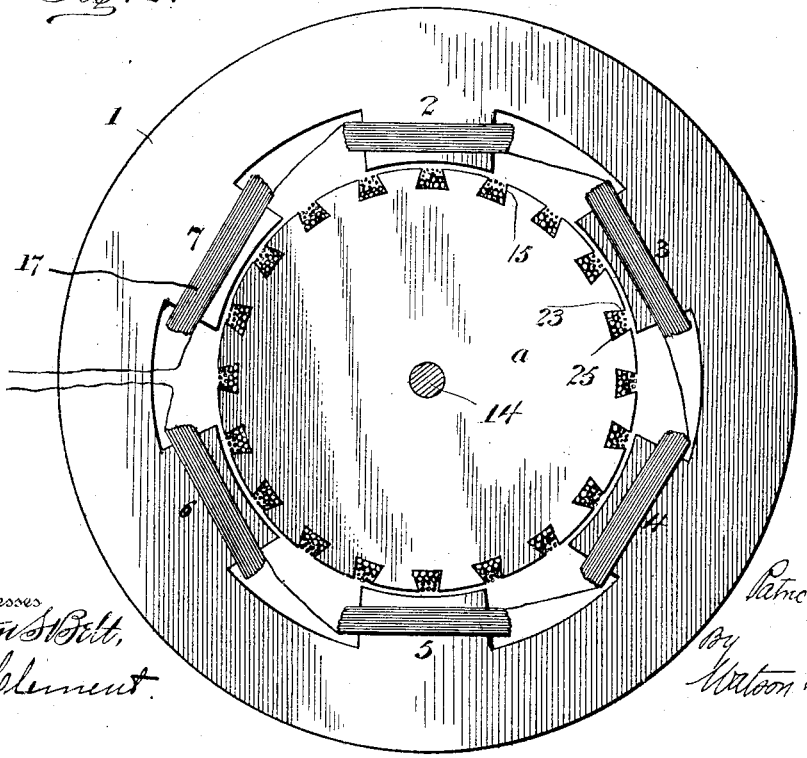

In the accompanying drawings, which illustrate the invention, Figure 1 is a central longitudinal section through a motor-generator embodying my improvements, the arrangement of circuits being shown diagrammatically. Fig. 2 is an end view of the direct-current side of the machine. Fig. 3 is a similar view of the alternating or pulsating current side of the machine, and Fig. 4 is a perspective view of a portion of the field-frame and pole-pieces.

Referring to the drawings, 1 indicates a circular field-frame having at one side a series of inwardly-projecting pole-pieces 2, 3, 4, 5, 6, and 7 and at the opposite side of the machine a corresponding series of pole-pieces 8, 9, 10, 11, 12, and 13. The machine shown in the drawings is a six-pole machine, although it may have any desired number of poles. Upon a suitably-journaled shaft 14 is mounted an armature $a$, arranged within the pole-pieces 2 to 7, inclusive, and upon the same shaft is arranged an armature or inductor $b$ within the pole-pieces 8 to 13, inclusive. As shown, the armatures are both grooved upon their peripheries, the grooves 15 in the armature $a$ running parallel with the shaft and the grooves 16 in the armature $b$ being inclined. The pole-pieces 2 to 7 are provided with coils 17, which are connected to a primary generator $g$, and the armature $a$ is provided with a series of coils which are connected to a commutator 18, the latter being connected by suitable brushes 19 and a circuit 20 to the generator $g$. As shown, the armature and field are connected in shunt, and a rheostat $h$ is provided, by means of which a resistance 21 may be inserted in the armature-circuit to start the motor or run it at a speed below the normal, and a resistance 22 may be inserted in the field to give a variable speed above the normal. The winding connected to the commutator 18 is an ordinary direct-current winding suitably proportioned for the voltage of the generator $g$. In the drawings only a single coil 23 of the motor-winding is shown for the purpose of illustration. Upon the opposite side of the armature $a$ is arranged a secondary commutator 24, and upon the armature, within the slots 15, are arranged secondary windings 25, which are connected to the commutator 24 and which when the machine is in motion generate a current of different voltage from the current in the motor-circuit. This arrangement of motor-generator is well known and is usually employed for converting currents of high potential into currents of low potential, and vice versa. Upon the shaft 14 and between the commutator secondary 24 and the rotary member or inductor $b$ is arranged a pair of insulated rings 26 and 27, which are connected by circuits 28 and 29, respectively, to diametrically opposite sections of the commutator 18. It will be seen that by applying brushes to these insulated rings a sinuous alternating current may be taken from said rings, this alternating current having a voltage equal to one-half the voltage of the motor-circuit. As shown in the drawings, wires 30 and 31 lead from the brushes upon the commutator 24 to switches 32, and wires 33 and 34 lead from the insulated rings to said switches. By operating these switches direct current from the secondary coils on the armature $a$ may be transmitted to the circuit 35, which leads to the electrodes 45 or points of service, or the alternating current from the insulated rings may be switched onto said circuit, the switches being arranged so that only one current source can be connected to the circuit 35 at one time. While I have for convenience shown two separate switches 32 in the drawings, it will be evident that in practice the switch-arms would be brought together to form a double-pole switch.

It will be seen that by operating the rheostat $h$ the speed of the motor will be varied. Hence the voltage in the secondary direct-current circuit will be correspondingly varied and the frequency in the alternating current will be varied. The currents thus derived may be used for a variety of purposes, such as cautery work, charging storage batteries, or treating patients.

For the purpose of applying alternating or pulsating current to the patient the second part of my apparatus is arranged as follows: The pole-pieces 8 to 13 are wound with primary coils 36, which may be connected by means of the switches 32 to either the secondary direct-current circuit or the alternating-current circuit, thus producing in said pole-pieces a constant field or an alternating field. Within the circuit 37, which connects the field-coils 36, is arranged a regulating device 38, having a variable ohmic resistance 39 and an inductive resistance 40, either of which may be thrown into the circuit by means of a lever 41. When the direct current is sent through the primary coils 36, the magnetic strength of the pole-pieces 8 to 13 may be varied by moving the lever 41 over the contact-points of the ohmic resistance, and when the alternating current is sent through said coils a movement of the lever in the opposite direction inserts inductive resistance, which regulates the volume of current flowing through said coils, and hence the magnetic strength of the pole-pieces. It will be noted that this variation in the strength of the alternating field will not be accompanied by a change in frequency unless the speed of the motor is changed.

The inductor or armature $b$ is a metal body having the longitudinal slots 16, which divide the periphery of said body into a series of polar projections 42. There is no winding upon this inductor, its purpose being to vary the strength of the field-poles as the poles or projections 42 rotate past them. Upon the field-pieces 8 to 13, inclusive, are arranged a series of secondary coils 43, which are or may be connected by suitable switches 44 to the circuit 35, leading to the electrodes or point of service. It will be seen that when the sinuous alternating current is sent from the insulated rings through the primary coils 36 a corresponding current will be generated in the secondary coils 43 and transmitted to the electrode-circuit and that owing to the rotation of the polar projections upon the inductor $b$ past the field-poles 8 to 13, inclusive, the sinuous current in the coils 43 will be given a wavy or tremulous character, which will intensify the effect upon the patient. Such a current gives the patient muscular exercise without exertion. By manipulating the rheostat $h$ the frequency may be varied, owing to the change in speed, or, if desired, by operating the regulator 38 the voltage and current may be changed without changing the frequency.

Instead of passing the alternating current through the coils 36 the switches 32 may be arranged to send the secondary direct current through said coils, thus producing a constant field in the poles 8 to 13, inclusive, which field is given a pulsating effect by the passage of the polar projections upon the inductor $b$. This variation in the magnetism of the pole-pieces produces a rapidly-alternating current of comparatively low intensity in the coils 43, which may be transmitted to the electrode-circuit. The frequency of the alternating current thus produced is dependent upon the speed of the motor and the number of projections upon the inductor and may be varied by varying the speed of the motor, or its volume and potential may be varied by means of the regulator 38.

It will be seen from the above description that with a single machine made according to my invention a number of currents varying in character may be derived and that the regulations of frequency, voltage, and volume of current is very readily effected. I preferably slot the poles 8 to 13, inclusive, as shown in Fig. 3. If desired, the insulated rings may be connected to the secondary commutator 24 instead of the commutator 18, although the latter arrangement is shown and preferred, except where the potential at the commutator 18 is very high.

Having thus described my invention, what I claim, and desire to secure by Letters Patent, is—

1. In a motor-generator, an armature having a direct-current winding, and a commutator therefor, secondary direct-current windings, and a commutator to which said latter windings are connected, insulated rings carried by the armature-shaft and connected to opposite sections of one of said commutators, an inductor upon the armature-shaft, field-poles opposite said inductor, primary and secondary field-coils upon said poles, an electrode-circuit connected to said secondary field-coils, and a switch arranged to connect said primary field-coils with the secondary commutator or the insulated rings, as desired.

2. In a motor-generator, an armature having a direct-current winding and a commutator therefor, secondary direct-current windings and a commutator to which said latter windings are connected, insulated rings carried by the armature-shaft and connected to opposite sections of one of said commutators, an inductor upon the armature-shaft, field-poles opposite said inductor, primary and secondary field-coils upon said poles, an electrode-circuit connected to said secondary field-coils, a regulating device in the primary field-coil circuit adapted to vary the ohmic or inductive resistance of the same, and a switch arranged to connect said primary field-coils with the secondary commutator or the insulated rings as desired.

3. In a motor-generator, an armature having a direct-current winding, and a commutator therefor, secondary direct-current windings, and a commutator to which said latter windings are connected, insulated rings carried by the armature-shaft and connected to opposite sections of one of said commutators, an inductor upon the armature-shaft, field-poles opposite said inductor, primary and secondary field-coils upon said poles, an electrode-circuit connected to said secondary field-coils, a switch arranged to connect said primary field-coils with the secondary commutator or the insulated rings as desired, and means for varying the speed of the motor.

4. In a motor-generator, an armature having a direct-current winding and a commutator therefor, secondary direct-current windings and a commutator to which said latter windings are connected, insulated rings carried by the armature-shaft and connected to opposite sections of one of said commutators, an inductor upon the armature-shaft, field-poles opposite said inductor, primary and secondary field-coils upon said poles, an electrode-circuit connected to said secondary field-coils, a regulating device in the primary field-coil circuit adapted to vary the ohmic or inductive resistance of the same, a switch arranged to connect said primary field-coils with the secondary commutator or the insulated rings as desired, and means for varying the speed of the motor.

5. In a motor-generator, an armature having a direct-current winding, and a commutator therefor, secondary direct-current windings, and a commutator to which said latter windings are connected, insulated rings carried by the armature-shaft and connected to opposite sections of one of said commutators, an inductor upon the armature-shaft, field-poles opposite said inductor, primary and secondary field-coils upon said poles, an electrode-circuit and switches arranged to connect said electrode-circuit with the secondary field-coils, the secondary commutator or the insulated rings, as desired.

6. The combination with a motor-generator arranged to produce direct and alternating currents, of an inductor upon the armature-shaft of said motor-generator, said inductor having teeth or projections upon its periphery, field-poles opposite said inductor, primary and secondary windings in inductive relation to one another upon said field-poles, means for passing either a direct or alternating current from said motor-generator through the primary coils, a device arranged to insert either an inductive or ohmic resistance in said primary coils, and an electrode-circuit connected to the secondary coils, and means for varying the speed of the motor-generator.

In testimony whereof I affix my signature in presence of two witnesses.

PATRICK JOSEPH COLLINS.

Witnesses:
WATSON BROWNING,
W. M. POINDEXTER.